US006772209B1

(12) United States Patent
Chernock et al.

(10) Patent No.: US 6,772,209 B1
(45) Date of Patent: Aug. 3, 2004

(54) EFFICIENT METHOD FOR RULE-BASED DISTRIBUTION AND MANAGEMENT OF CONTENT IN A DISTRIBUTED HIERARCHY OF STORAGE DEVICES

(75) Inventors: Richard S. Chernock, Newtown, CT (US); Paolo Dettori, Bedford Hills, NY (US); Frank A. Schaffa, Hartsdale, NY (US); David I. Seidman, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/544,625

(22) Filed: Apr. 6, 2000

(51) Int. Cl.$^7$ ............................................ G06F 15/173
(52) U.S. Cl. ........................ 709/225; 709/225; 709/226; 709/245; 709/246
(58) Field of Search ................................ 709/225, 226, 709/223, 245, 246, 214, 204, 205, 213; 711/114

(56) References Cited

U.S. PATENT DOCUMENTS

| 5,264,933 A | * | 11/1993 | Rosser et al. | ................ | 348/578 |
| 5,543,856 A | * | 8/1996 | Rosser et al. | ................ | 348/578 |
| 6,029,045 A | * | 2/2000 | Picco et al. | .................... | 725/34 |
| 6,392,664 B1 | * | 5/2002 | White et al. | ................. | 345/717 |
| 6,446,261 B1 | * | 9/2002 | Rosser | ........................ | 725/34 |

* cited by examiner

*Primary Examiner*—Sahera Halim
(74) *Attorney, Agent, or Firm*—Douglas W. Cameron; Anne V. Dougherty

(57) ABSTRACT

For a network with a distributed hierarchical broadcast architecture, a method for efficiently and reliably distributing data content and remotely managing the storage of content. Both the distribution and the storage management methods are rule-based, utilizing network resources in an efficient manner. Simple and reliable mechanisms are provided for ensuring both data integrity and control over storage utilization. At each stage throughout the network hierarchy, content is distributed to nodes in the subsequent stage based on rules. The rules may be modified at each stage. Only one device in the hierarchy is required to maintain detailed information of the storage characteristics of storage devices and content therein in stages which are subsequent to it in the network. The recipient device owner specifies a set of preferences which may be used for local filtering, or which the owning (or other) entity may use to select data which targets the client's interests. The downloaded data may be presented to the client in the form of an interactive application, video, audio, still image, or other format.

28 Claims, 4 Drawing Sheets

EFFICIENT METHOD FOR RULE-BASED DISTRIBUTION AND MANAGEMENT OF CONTENT IN A DISTRIBUTED HIERARCHY OF STORAGE DEVICES

FIELD OF THE INVENTION

The invention relates generally to the transmission and storage of data among a plurality of nodes and more particularly to remote management of distribution and control of data through a hierarchy of nodes.

BACKGROUND OF THE INVENTION

The emergence of digital television broadcasting systems requires a change in traditional methods of communication and management, both between central distribution sites and remote stations and between remote stations and clients. One aspect of the new systems will concern how data is reliably distributed among these entities, and how storage devices are managed.

Methods for broadcast distribution of data objects are known in the art. U.S. Pat. No. 5,613,065 describes a system for information broadcasting utilizing error check codes to determine if a remote client has received a broadcast without error. U.S. Pat. No. 4,908,828 describes the use of cyclic retransmission and CRC testing of a packetized broadcast. U.S. Pat. No. 5,631,907 utilizes cyclic transmission, block numbering and forward error correction for broadcast file distribution along with point-to-point communications to a particular station if blocks are not received after the last cycle. All of these methods require periodic retransmission of the data objects to ensure reliable reception, at a cost of increased bandwidth.

U.S. Pat. Nos. 5,222,061 and 5,535,229 describe systems that utilize retransmission of incorrectly-received packets based upon requests by the client. These systems operate in point-to-point mode and do not take advantage of the broadcast capability existing for a digital television broadcast system. U.S. Pat. No. 5,619,689 adds the capability of aggregating retransmission requests through hub servers, but operates in a point-to-point message-acknowledgement system.

U.S. Pat. No. 4,868,866 describes a method for broadcasting database updates where the updates are modified by comparing the updated material to a record of what had been previously transmitted. Such a method requires the central distribution site to be aware of the state of data objects at each receiving client.

U.S. Pat. No. 5,666,293 describes a method of downloading software through a broadcast channel, where cyclic transmission of packetized data is used for reliable reception. In the method described therein, the same content is broadcast to all clients and the client is responsible for deciding which data to download.

In all of the systems of the above-referenced patents, the memory local to each device is managed by that device, to hold content which has been transmitted from other devices.

What is needed is a system and method for the distribution of content to, and the management of content in, a hierarchy of storage devices, which allows some or all of the local storage in a device to be managed by other devices in the hierarchy, without requiring the managing device to have detailed information concerning those storage devices. It is, therefore, an object of the present invention to provide the foregoing system and method.

It is another object of the present invention to provide a reliable, low-overhead mechanism to distribute data objects to remote clients through a broadcast mechanism which is predominantly one-way, where each node in the distribution system need only have information about the next step in the chain.

Still another object of the invention is to provide a means for ensuring reliable transmission of data objects by utilizing a return channel mechanism (if one is available) only to request retransmissions when specific data blocks are not delivered completely or are found to contain errors. This return channel mechanism optimally aggregates requests from preceding nodes, and each node need only have information about the nodes immediately connected to it.

Yet another object of the present invention is to provide a system and method for managing data objects on remote clients through a hierarchical distribution in a primarily one-way broadcast system, where the amount of information needed by a node is limited to information regarding the immediately connected nodes, and where the source, and many intermediate nodes, are freed from the requirement of knowing specific details about the storage configuration of the client device, or other details regarding the client, such as identity or address information.

SUMMARY OF THE INVENTION

The foregoing and other objects are realized by the present invention which, for a network with a distributed hierarchical broadcast architecture, provides a system and a method for efficiently and reliably distributing data content (including audio, video, and software) and remotely managing the storage of content. Both the distribution and the storage management methods are rule-based, utilizing network resources, and particularly network bandwidth, in an efficient manner. Simple and reliable mechanisms are provided for ensuring both data integrity and a high degree of control over storage utilization.

At each stage throughout the network hierarchy, content is distributed to nodes in the subsequent stage based on rules. The rules may be modified at each stage. Each entity in the hierarchy has detailed information of the storage characteristic& of only the entities in the stage immediately subsequent to it, but may nevertheless distribute content to and, through intermediate entities, manage the storage devices of entities which are any number of stages remote from it.

The client device owner specifies a set of preference information which may be used for local filtering, or which the owning (or other) entity may use to select data which targets the client's interests. The downloaded data may be presented to the client in the form of an interactive application, video, audio, still image, or other format.

BRIEF DESCRIPTION OF THE DRAWINGS

The invention will now be described in greater detail with specific reference to the appended drawings wherein.

DETAILED DESCRIPTION OF THE INVENTION

Figure 1:
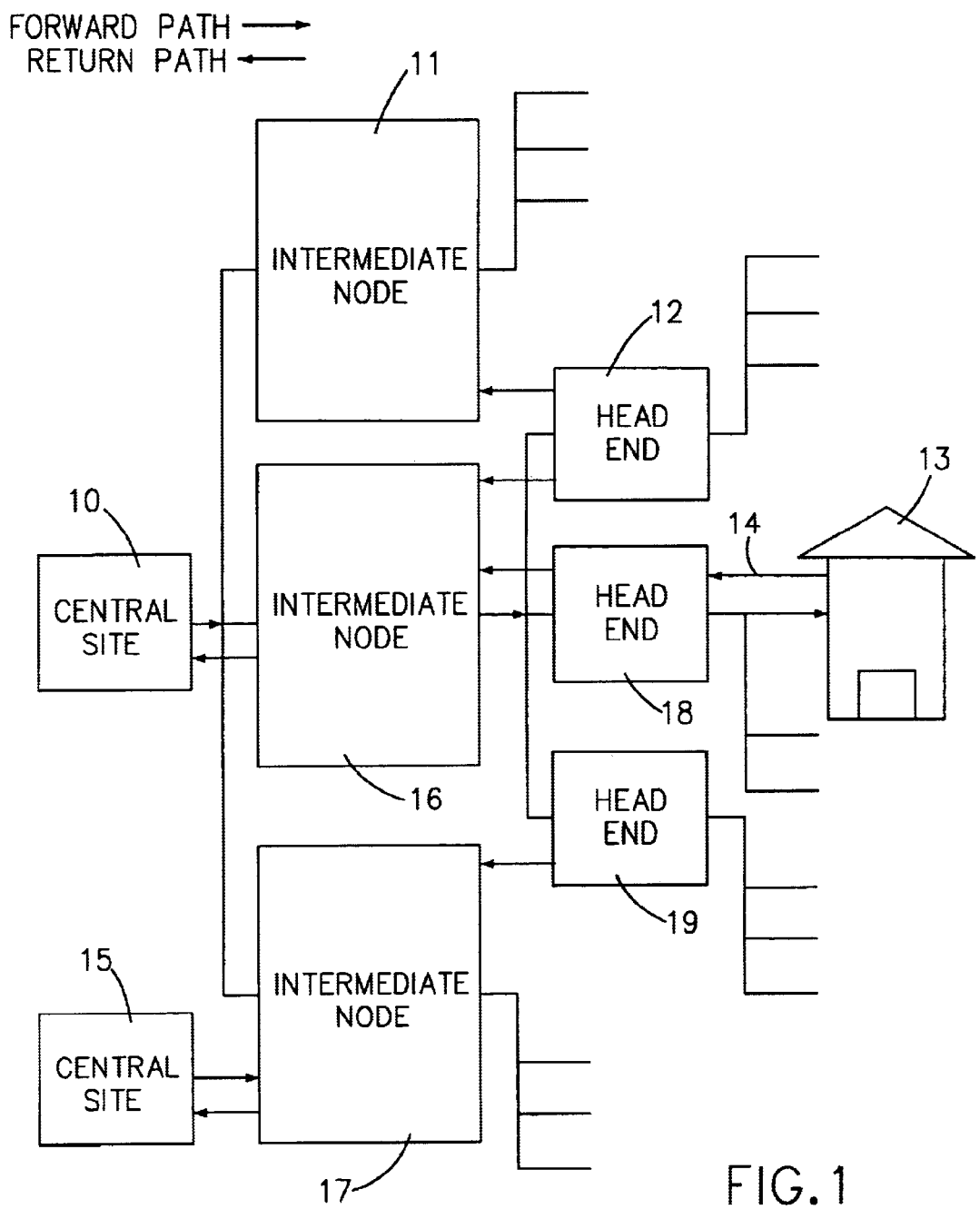
FIG. 1 schematically illustrates a hierarchical distribution system, showing data flow in the downstream direction and retransmission requests in the upstream direction.

The present invention pertains to hierarchical broadcast systems for the distribution of data, including audio, video, and software content. It may use any network infrastructure, such as satellite, PSTN, or hybrid fiber-coaxial cable. The following definitions apply to terms will be used in this discussion and subsequently in this document:

Access to content—The ability of a device (such as a processor) or application to read (read access) or modify (write access) stored content.

Content—Generally refers to all multimedia material, such as programs, data files, video and audio material, etc.

Content characteristics—Features of stored content such as priority level, expiration date and time, size (in bytes), etc.

Content distribution—The dissemination of content, originating from a source node and terminating at a recipient node.

Content expiration—Date and time when the storage of content on a given storage device is to be terminated.

Content removal—Termination of storage for a given item of content on a storage device.

Control information—Ancillary information associated with an item of content, describing some characteristics of the content, such as a description of demographics of desired recipients for this content.

Demographic information—Data regarding the interests, viewing habits, and other characteristics of recipients (viewers), used in targeting content to specific recipients.

Display of content—The display, at a recipient node, of content which is stored in a storage device at this node.

Display conditions—Conditions under which the content is to be shown to the recipient, such as display schedule, program to be used for display (such as a media player), etc.

Expired content—Content whose expiration time has been reached.

Intermediate node—A node which resides between a source node and a recipient node. Note that a given node may be an intermediate node with respect to one item of content, and a recipient node with respect to another item.

Managing node—The node with responsibility for managing a given recipient node or nodes, with respect to a given region of a storage device which resides at the recipient node. This node is not necessarily the node at which detailed content characteristic information is maintained.

Negotiation—The process whereby nodes arbitrate for the right to store content at a given region of a storage device.

Preemption—The process of replacing one item of content on a storage device with another.

Preemption condition—The conditions under which a given item of content on a storage device may be replaced by another item.

Priority level—A characteristic of an item of content which is used to determine if it is to be preempted by another item of content.

Recipient node—The node in the network which is the intended recipient of an item of content which is sent by a source node.

Remote management—The management, by a managing node which is physically remote from it, of a region of a storage device on a storage-resident node.

Return channel—A channel for communication between recipient or intermediate nodes and a source node.

Source node—A node which initiates the sending of an item of content which is to be sent to a recipient node.

Storage device—A device which resides at a storage-resident node and is used for the storage of content, such as a disk drive.

Storage device characteristics—Features of a storage device, such as maximum capacity, seek time, and access time.

Storage-resident node—A node at which a storage device resides.

FIG. 1 provides a schematic diagram of one network for implementation of the present invention. Central sites 10 and 15 each provide content to intermediate nodes 11, 16 and 17 which, in turn, may direct the content to one or more of the head end nodes 12, 18 and 19. The end nodes in the network may be television set-top boxes (STBs), personal computers (PCs), or other devices including pagers and palmtop computers in home 13. The invention applies to networks connected in any topology In networks with a return channel (e.g., channel 14 in FIG. 1), the network return topology is also arbitrary, and need not be the same as the network topology in the forward direction. As will be discussed in detail below, each node, for example intermediate node 16, need only have specific information about the nodes (hereinafter referred to as "proximate nodes") immediately adjacent to it. In the illustrated system, node 16 would have information about head end nodes 12 and 18 in the downstream direction and, due to the fact that a return channel is available, also about central site 10 in the upstream direction.

The intent of this invention is to provide a means for a network node, in a hierarchical broadcast distribution architecture, to perform the functions of reliably distributing and retransmitting content to a plurality of nodes in the network, in a uniquely flexible rule-based manner. This method potentially allows each entity in the hierarchy to modify the rules. In addition, the invention provides a system and method to perform this distribution in a bandwidth-conserving manner. The network node owns and manages some of the storage capacity which is resident on a plurality of other nodes in the network, with a storage management architecture which is not point-to-point. Therefore, the managing entity is freed from knowing specific details about the storage configuration of the client device, or other details regarding the client, such as identity or address information. In addition, the present invention allows for multiple items of content (such as video clips) to reside in a client storage device, while the priority of the display of these items is under the control of a remote entity; and/or allows for multiple items of content (such as video clips) to reside in an intermediate node, and for that intermediate node to add them to (or use them to modify) the content which it is distributing. Finally, the invention allows a node to have access to some of the storage on a client device, along with other potentially arbitrating and competing entities, to the exclusion of the client itself.

Management of storage devices in remote entities includes prioritization of content, dating of content, device diagnostics, content filtering, statistics generation for quality control, preemption of lower-priority content, deletion of expired content, and control of access to and presentation of content. The foregoing functions are shared between the remote owning entity, the intermediate entities, and the end device (hereinafter also referred to as the client or, recipient device).

Thus, in contrast with the typical scenario of client-controlled local storage, sections of the storage on a client device can instead be owned by entities other than the owner of the client device. The owning entities maintain (through intermediate entities) the content which is downloaded to these storage locations, and may arbitrate among themselves for control of storage locations. The owner of the client device is allowed access to the content only as permitted by the owning entity.

In all preferred embodiments of the present invention, content (audio, video, still image information, programming, etc.) is delivered over a network in digital format, due to the greater bandwidth and reliability of digital systems over analog systems. It is to be noted that the invention could be implemented in an analog system as well. The network used for the preferred embodiments of the present invention may include a return channel (from client to other nodes in the network). The availability and use of a return channel is preferable since some of the storage management functions (such as device diagnostics) can only be implemented in networks which have return channels. It will be apparent to one having skill in the art that a preferred embodiment can still be implemented in a "one-way" network; however, the resulting inventive system will have slightly less functionality.

The source node determines which data is to be transmitted to the recipients. This includes the data content (such as a video clip, audio clip, still image, program, etc.) as well as control information. In the preferred embodiment, the control information is sent in the form of control messages which specify to the intermediate and/or recipient nodes the rules for storage and disposition of the data. There are three types of rules, including access rules, distribution rules, and disposition rules, which are initially specified by the source node and which may, in some instances, be modified by other nodes, as described below.

Access rules specify which entities are allowed access to view, add to, and modify the data. For example, specific intermediate nodes may be allowed to add to the data which is being distributed. One such example is the instance wherein a head end node appends a few seconds of video (with local retailer information) to the end of a video commercial. Access rules also govern the ability of the end user to access the data which has been stored on his device.

Distribution rules specify the intended recipients of the data. These rules may also be modified, as in the case of a source node which specifies that the data is to be distributed to n users having certain demographic attributes, but is unable to specify which users. Intermediate nodes which are closer to the user, on the basis of information known to them but not to the source node, such as demographic data on household incomes and interests, can then modify the distribution rules to target users who may be interested in the data.

The source node also introduces control information related to the content (the so-called "disposition" rules) including its format, size, duration, means of display, initial validity time, display time, and expiration time, and rules for the modification of rules by intermediate nodes. Disposition rules also include the type of storage to be used for the data (if there is a choice), the expiration date and time of the data, the priority level of the data, how and when the data is to be displayed, and rules for the preemption of the data's storage (or its display) by other data.

The control information comprising the rules is relayed in the form of control messages to the nodes in the hierarchy which handle the content. Most of the control messages are simply forwarded to the proximate node, which stores them and manages the content on the client accordingly. If desired and allowed, intermediate nodes may modify the rules before forwarding.

In addition to the content and rules, the source node may also distribute application programs to be used for the display of the data on the recipient node.

The content, such as a video clip, is broadcast ephemerally by a given node (i.e., a "source node") to nodes which are in the following stage or level. This conserves bandwidth as compared with cyclic broadcasting schemes. The source node directs the content to the nodes which are its intended recipients, using so-called "addressing rules" or distribution rules which are interpreted, and which may be modified, by each intermediate node. As mentioned above, included with the data content are rules for its storage and disposition at the recipient node, such as date/time of content validity, date/time of content presentation to user, date/time of content expiration, content priority level (used in preemptive systems), accessibility of content for user browsing, addressing information for storage at the recipient node, information regarding which nodes are authorized to modify data and rules, and the application which is to be used for the presentation of that content.

Before it can distribute content to storage devices, a source node must determine where storage space is available, and acquire the rights to that space for some period. These rights may be absolute (i.e. the source owns the use of that storage space for the entire period) or conditional. If conditional rights are acquired, the source's content may be preempted by content from other sources, subject to negotiation. Thus, such storage is acquired on an "as available" or "opportunistic" basis. Acquisition of rights to storage space may be done out of the network, through regular business and legal channels. Alternatively, the present invention provides for the determination of available space and the negotiation for it to be performed dynamically within the network, by the exchange of control messages among nodes, as further detailed below.

Figure 2:
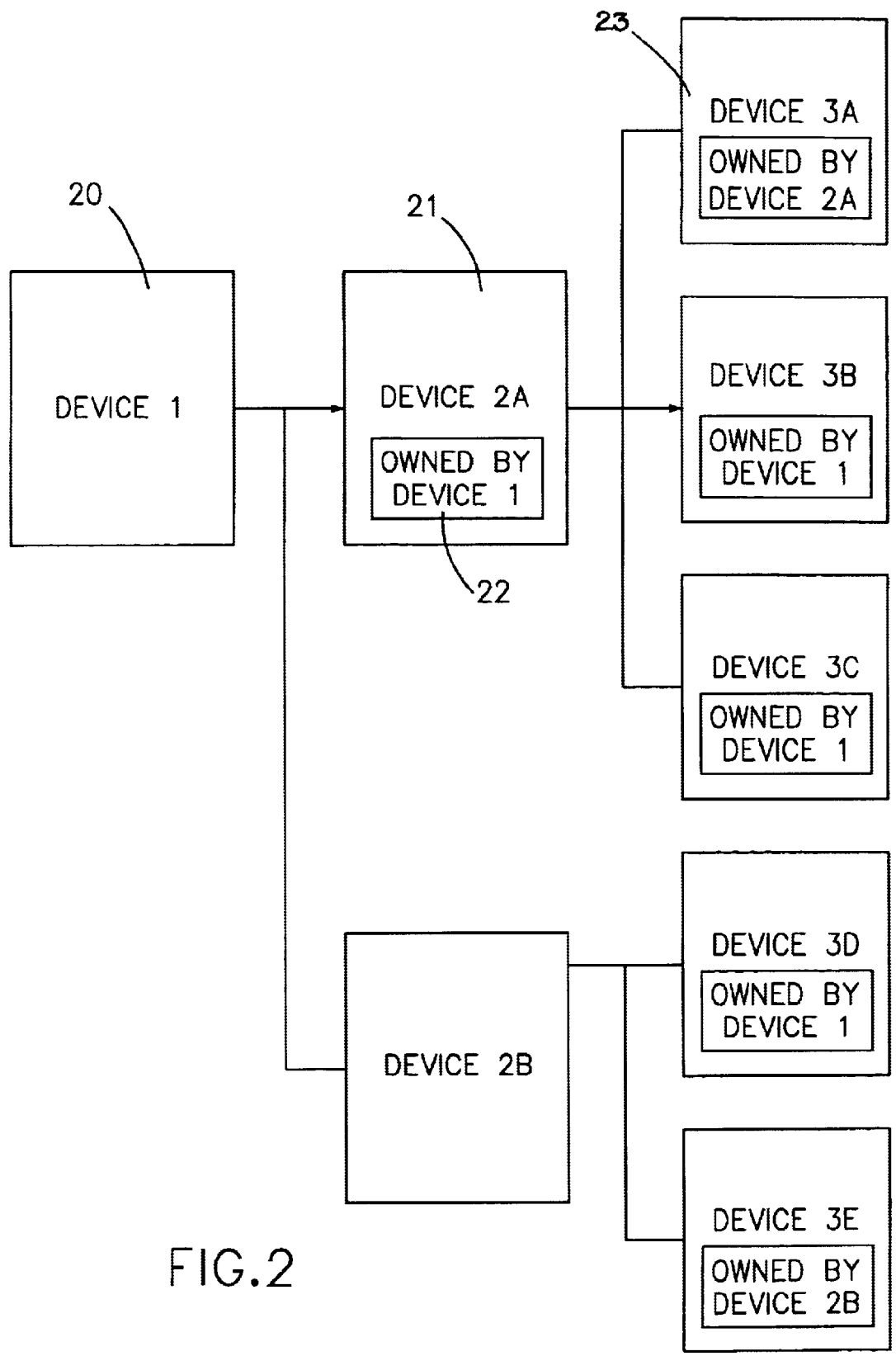
FIG. 2 depicts an example of storage ownership in a hierarchy of devices.

FIG. 2 shows a hierarchy of devices and their storage, some of the capacity of which is owned and managed by devices which are higher in the hierarchy than the device at which the storage resides. In the figure, a source node (device 1) 20 distributes content to nodes in the succeeding level 21 and nodes in one level 23 following that. Some of the storage 22 in the destination (recipient) nodes is owned by devices which are higher in the hierarchy. It should be noted that a node may be a source node in the context of some content, and an intermediate node in the context of other content. In the illustrated hierarchy, command and control messages are utilized for communication among the respective entities.

Control messages are used for the remote management of devices in the hierarchy and may be sent by the owning device, or by other devices, in order to determine the state of the storage on the destination device, to poll a device or a group of devices for the state of their storage, and to modify the status of storage on managed devices, if such modification is allowed.

Command functions include the following: negotiating with the owning device for use of storage on a device or a group of devices; querying or setting the priority of a range of memory space on a device or group of devices; querying the owning device of a range of memory space on a device or group of devices; querying the expiration date/time of a range of memory space on a device or group of devices; setting the read/write ability of the destination device to access the content of a range of memory space; setting the read/write ability of other devices to access management information for a range of memory space; and reporting on the owning device, expiration date/time, cost, availability, or other characteristics of a range of memory space on a device or group of devices.

While conserving data bandwidth, the method embodied in this invention also reduces the flow of control messages on the network, which messages are required for storage management and data flow control. Conservation is achieved by requiring each node in the hierarchy to handle management tasks only for the nodes which are subsequent to it (i.e., proximate downstream nodes), and by aggregating retransmission requests for all nodes which are previous to it (i.e., proximate upstream nodes). Such a scheme eliminates the need for a node to maintain detailed information concerning the management of nodes which are not immediately subsequent to it in the downstream direction or immediately prior to it in the upstream direction. This "control isolation" adds to the efficiency of storage and network management an the network.

The structure of remote memory management command messages is as follows:

| Command Type | command code | source ID | dest. ID | Dest.base address | dest. range | Parameter 1 | ... | Parameter n |
|---|---|---|---|---|---|---|---|---|
| Command types: | Set | | | | | | | |
| | Query | | | | | | | |
| | Report | | | | | | | |
| | Purge | | | | | | | |
| Command codes: | Occupancy | | | | | | | |
| | Cost | | | | | | | |
| | Priority | | | | | | | |
| | Expiration date/time | | | | | | | |
| | Owner ID | | | | | | | |
| | Read/write access for content - destination device | | | | | | | |
| | Read/write access for management info - other devices | | | | | | | |

Searching and negotiating for memory space are unique and innovative functions enabled by this invention. The invention enables an entity, such as a broadcaster, to dynamically determine who owns the storage on a large number of devices, such as set-top boxes (STB), which are not owned by it, provided that this information is not protected. As an example, a representative scenario is one in which a user will have access to some of the storage on his STB, while the user's cable company, which owns the STB, will also own some of the storage. Some of the storage owned by the cable company may be readable by the user; some may not. In addition, other portions of the memory in the STB may be owned by or "leased" to various advertisers. For example, the cable company may contract with an advertiser to lease the advertiser of the storage on a number of cable subscribers' STBs. If so agreed, some content related to the advertiser, such as images of catalog pages, will reside on the users' STBs for the length of the agreement, after which that content will be purged. While it is resident, the user, using a type of browser optimized for the TV environment, may browse through the catalogs which are stored at his STB at his leisure, and may even make purchases if a return channel is available. Alternatively, the resident content may be used to replace video content (e.g., in the last seconds of an advertiser's national commercial) where the resident content comprises a short video clip showing the locations of retailers of this product who are local to the user. The resident content can be played from storage, as triggered by control data which accompanies the incoming content stream.

The management required for the above scenarios involves dynamically determining the availability of a range of memory, determining the cost of a range of memory, determining the owning device for a range of memory, negotiating with the owning device for control of the memory for the desired time period, creating the control information to accompany the content, downloading the content to the memory at the destination devices, setting the owning device ID for the range of memory, setting read access for the destination devices, setting the expiration date and time for the content, and purging the content upon its expiration.

Figure 3:
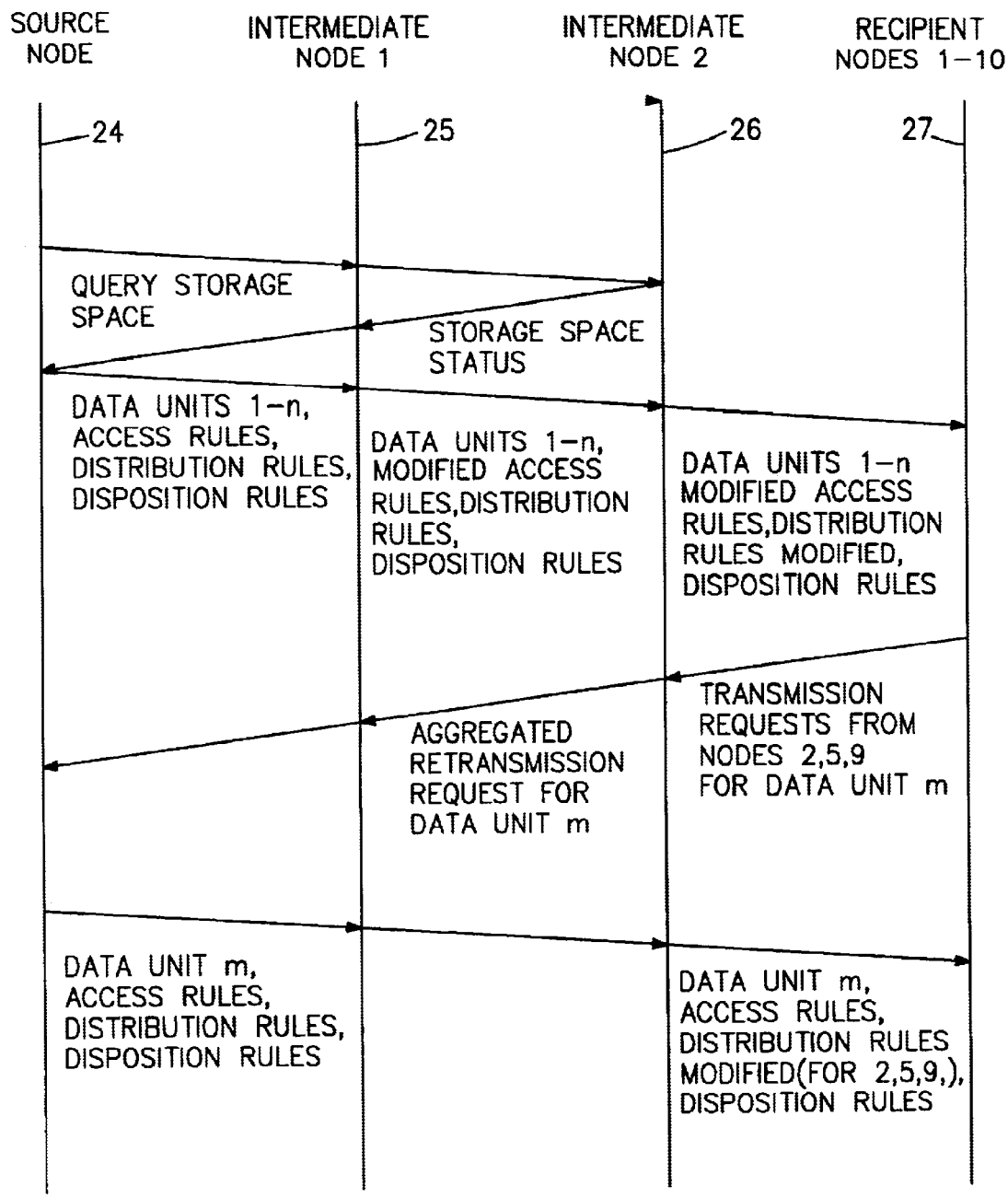
FIG. 3 shows the sequence of control messages used in negotiating for storage space, sending units of data, and requesting and receiving retransmissions of data units.

FIG. 3 shows the exchange of command messages during a negotiation for storage space, as well as during the transmission and retransmission of data content. A source node at 34, which wishes to store and display content on devices at ten recipient nodes, sends a "query storage space" message to the first intermediate node (IN1), specifying the required storage space and the period of time it is to be stored.

Not having space on the recipient nodes connected to it, the first intermediate node IN1 at 35 relays the message to the second intermediate node IN2 at 36. Assuming the node IN2 is attached to many recipient nodes, RN1–RN10, with adequate storage space, the node indicates such with a "storage space status" message which is sent to IN1 at 35 and relayed to the source node at 34. The second intermediate node selects ten of these nodes to be the recipients, based on end-user preference information which indicates that the users may be interested in this content.

The source node then sends n data units (comprising the data content), along with control information comprising access, disposition, and distribution rules, to IN1 at 35, which relays them to IN2 at 36 and to the recipient nodes RN1–RN10 at 37. Along the way, IN1 modifies the data content (e.g. adding some local retailer information to an advertisement) as permitted by the control information In addition, IN2 modifies the distribution rules, since it (and not the source node or IN1) knows the addresses of the recipient nodes.

To further illustrate the system and method, it is assumed for this example that, of the n units of data, one node fails to receive unit 2, one fails to receive unit 5, and one fails to receive unit 9. These recipient nodes at 37 send retransmission requests for the respective units to IN2 at 36, which is their proximate node. IN2 aggregates these requests and sends a request for these three data units to IN1 at 35. In response, IN1 relays the request to the source node at 34, followed by the source node rebroadcasting the units. The units are received and relayed by IN1 and IN2, with the latter, knowing which nodes requested them, modifying the distribution rules as required. Finally, the retransmitted data units are received by the appropriate recipient nodes.

At each intermediate node between the source node(s) and the recipient node(s) (see FIG. 1), the addressing rules which are associated with the content are interpreted and possibly modified. The content itself may be modified, added to, or replaced, if control information which accompanies the content indicates that the intermediate node is authorized to do so. An example of this is local purchasing information, such that an intermediate node may add this information, in the form of a graphic or video clip, to a nationally-broadcast advertisement, in order for viewers to learn where the product may be obtained in their area.

Address modification may be useful since, due to control isolation, a more closely located node will know more about network and storage conditions at the recipient node (or on the path to this node) than will nodes which are more remote. The intermediate node which is closest to the recipient node (the recipient's "proximate node") performs low-level storage maintenance functions. These include determining the client storage device for the content, determining the physical address in client storage for the content, and overwriting content in the case of pre-emption.

The proximate node must keep a record of information related to the content which it distributes to recipients. In one preferred embodiment, it uses one data structure for each of the units of content. Such a data structure would have the following format:

> Content identifier (CID)
> Size (in bytes)
> Source node identifier (SID)
> Number of recipient devices (N)
> Start validity date/time
> Display date(s)/time(s)
> Expiration date/time
> Recipient read/write access
> Recipient identifier (RID) (array of size N)

This information is common to all devices which are recipients of the particular unit of content. Additionally, a data structure must be maintained for each recipient device for which this proximate node manages storage. The data structure would have the following format:

> Recipient identifier (RID)
> Recipient IP address
> Number of units of content stored (M)
> Content identifier (array of size M)
> Storage base address (array of size M)
> Priority level (array of size M)
> Pointer to display application (array of size M)

In addition, at each recipient node, a data structure must be maintained for each unit of content which is stored there. Note that the different units of content which are stored at a given recipient node may be managed by different proximate nodes. This data structure would have the following format:

> Content identifier (CID)
> Storage base address
> Size (in bytes)
> Mime type (or other display parameters)
> Pointer to display application
> Start validity date/time
> Display date(s)/time(s)
> Expiration date/time
> Priority level
> Source node identifier (SID)
> Proximate node identifier (PNID)
> Read/write access At the recipient node, the content is stored using the content-related data which accompanied it, such as address and expiration date and time. Since a region in the storage which resides at the recipient device is owned by another node in the hierarchy, that owning node will have read and write access to the device. For a given negotiated transmission, the source node(s) will have read and write access to all of this region, while some applications running on the recipient node will have read access to a part of this region. For security and privacy, the source or intermediate node(s) will not be allowed to access regions on the recipient device which are owned by the client.

Since multiple source nodes may own different regions of a given storage device, the capability is enabled for these nodes to negotiate, using control messages, for the management of a given region. These negotiations may involve trading memory region size for speed (e.g., swapping a 1MB region with 50 ns access time for a 5MB region with 100 ns access time). These negotiations can be performed in advance of the storage being actually available, since expiration time information is known by each node's proximate node.

An application which runs on the recipient (client) node performs the lowest level of storage maintenance functions, such as access control, deletion of expired content, "garbage collection" of memory regions, and requests for retransmission of missing or corrupted content. The latter are sent to the proximate node via the return channel. Another client node application performs the display of the content.

With the client's consent, the recipient node can collect viewing data, such as viewing times, channels viewed, programs viewed, amount of channel surfing, and the amount of interactivity in which the viewer engages. This information is stored in the recipient and is periodically relayed upstream, via the return channel. As is the case with retransmission requests, this information is aggregated so that only the proximate nodes have detailed viewing information for any individual household.

Figure 4:
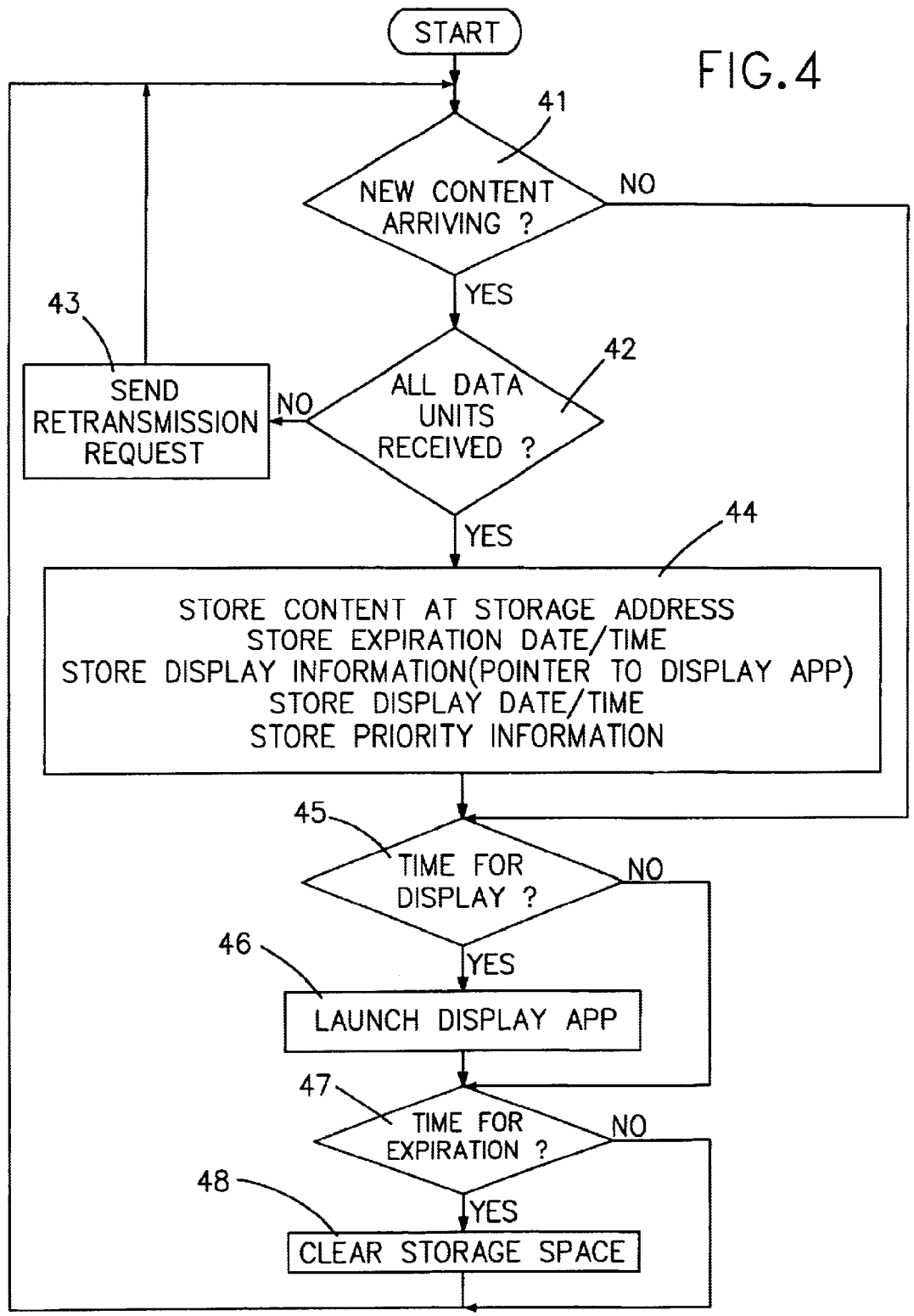
FIG. 4 comprises a flowchart for the process of data reception, storage, display and deletion at the recipient node.

FIG. 4 shows a flowchart for the process of data reception, storage, display and deletion at the recipient node. An application monitors the arrival of new data 41 at the recipient node. If data arrives, a check is performed to determine if all units of data were received correctly 42. If not all data were received, a retransmission request 43 is sent to the proximate node, which relays it (through intermediate nodes) to the source node.

Once all data units for an item of data content have been received at the recipient node, the data itself and its parameters are stored at 44. The parameters include the data display time(s) and date(s), expiration time and date, information relating to the display of the data, and its priority level, as well as the other entries listed in the above data structure.

An application checks on the current time, to determine if it is time for the data to be displayed at 45. If so, the display application is launched at 46. A similar application checks to determine whether any data has reached its expiration date and time at 47. If so, the data is deleted at 48. In the preferred embodiment, the aforementioned applications (data reception, display check, expiration check) are implemented as multiple threads, requiring a processor and operating system on the recipient device which can efficiently handle multi-threaded programming.

As is the case with addressing distribution rules, the disposition rules for storage management may be modified dynamically by the intermediate node, the recipient's proximate node, or at the storage device. For instance, if several content providers have purchased the right to control some of the "owned" region of memory on the recipients device, content may be pre-empted by other content having a higher priority, in advance of its expiration date and time.

Each item stored in the managed memory has a priority level associated with it. This priority level can be used in the determination of a storage address for the item, in the case of a managed memory within which different regions have different characteristics such as access time and reliability. The priority of an item can also be used in the context of pre-emptive or opportunistic storage, in which lower-priority content can be stored on an "as available" basis, until or unless higher-priority content pre-empts it.

If the content-receiving application on the recipient device detects that a block of data from the distributing node has not been received, or has been received with errors, as determined in the check at step 42, the data may be obtained during a re-broadcast, if waiting is feasible. If not, and a return channel is available, a retransmission request will be sent upstream.

At each intermediate node en route to the source node, retransmission requests will be aggregated, to reduce the bandwidth required for these requests. Each intermediate node needs to know only about the retransmission needs of the node(s) which are directly connected to it. The control isolation in this case again eliminates the requirement for a node to maintain detailed information regarding the retransmission needs of nodes which are not adjacent to it in the hierarchy.

In one example implementation of the current invention, the invention is used for the distribution of video content, such as video advertisements, from a central broadcast distribution site to multiple broadcast head-ends. A system is implemented which distributes content, such as video advertisements, from a super head end (the central sites or central source nodes 10, 15 of FIG. 1) to clients (regional cable head ends 12, 18 and 19) for subsequent broadcast. For example, the central sites may be cable and satellite content providers.

In a simple rule example for such a two-layer system, the first layer (central site) will interpret the first line of the rule and address the broadcast to regional head-ends in New England States. The head-ends will interpret the second line of the rule and distribute these objects to the destination nodes at viewers' homes 13 which (-based on demographic data) are the target audience for a particular video advertisement. The head-ends may also perform content modification, addition, or replacement, such as a brief (e.g., 5 second) video clip appended to a video advertisement to inform viewers of the locations of local retailers for the advertised product.

An additional variation on this embodiment allows intermediate nodes, 11, 16 and 17 of FIG. 1, to add multiple varieties of added content (such as several video clips with locations of local retailers) which are then filtered by the STB for selection off only one to be displayed to the viewer. For example, the STB may select the video clip for the location closest to the viewer's address. In the FIG. 1 hierarchical system with intermediate nodes between multiple central sites and the head ends, commercial spots need to be distributed from a central location to emission stations (broadcasters and/or head-ends) through a satellite distribution mechanism. The spots consist of MPEG2 transport stream files and will be distributed in a file-transfer manner (not isochronous streams) over an DVB compliant MPEG transport. The distribution of these files needs addressing capability, since files will typically go to a subset of the receiving stations. The volume of distribution is anticipated to be large, within a bandwidth constrained environment, thus efficiency in delivery is required. Additionally, reliable delivery is a requirement. While the data will be delivered over a one-way broadcast pipe, an additional point-to-point two-way control path is available through PSTN and will use TCP/IP protocols for communication.

Files will be carried over standards-compliant transport with a two way (PS-TN-TCP/IP) control system used primarily to request the retransmission of corrupted blocks. The files are broken up into identifiable, reasonably-sized (e.g., about 4K, appropriate for MPEG transport quantization) blocks for transmission. These blocks will have error detection and forward error correction (FEC).

The control system will allow stations to request retransmission of blocks that have been corrupted (or not received). If the head end or destination node detects that it has failed to receive an item or has received part of it with errors, a return channel, such as channel 14, may be used, if available, to send a request for retransmission upstream to the central site. Retransmission requests from multiple destination nodes or head ends are aggregated at an intermediate node, for example at node 11, for a savings in bandwidth utilization. If a return channel is not available, or if waiting is feasible, the item may be re-broadcast, possibly at off-peak times such as late at night when network loading is lower.

Since files will typically be addressed to a group of stations, with the stations typically being in the same geographical area, the most common source of errors for satellite distribution is weather, and that, kind of error condition will likely affect a group of stations rather than only one. To avoid a flood of retransmission requests, a scheme is used to simplify the retransmission process, which may include aspects of regional concentration (one station within a region acts as the consolidator of the retransmission requests), random fallback (each station will wait a randomized time to request retransmission, while continually checking the retransmission schedule), and/or adding scheduled block retransmissions to the broadcast control structure.

The data structure maps into either the Private Section Syntax or PES syntax. Many MPEG2 demultiplexers can filter single sections in hardware, off-loading some of the processing which the receiving application must perform.

In a second implementation of the current invention, the invention is used to distribute content such as catalog page images, to the local storage devices of viewers' STBs, and to manage a region of those storage devices. A related example is the distribution of content for interactive advertisements and applets to display these advertisements on the STB.

For example, an advertiser may contract with a cable company (which owns set-top boxes in thousands of homes) for 250K bytes of storage on each of 10,000 set-tops. The advertiser may wish to store 10 pages of catalog images (e.g., at 20K bytes each) plus an STB application for the display of the catalog (e.g., 50 Kbytes) at each STB. The contract specifies that this storage be dedicated to the advertiser's content for two weeks and be conditionally available for an additional two weeks.

The cable company's central site (source node) broadcasts the catalog pages to its head end sites in five states, requesting that each distribute them to 2,000 of their subscribers. The head ends (intermediate nodes), which have the most detailed information on their subscribers, such as family income and household size, select 2,000 subscribers to whom the advertiser's product is likely to appeal.

The catalog pages are downloaded to these subscribers' STB's (recipient nodes), whose storage characteristics are known to the head ends. If any STB did not receive an error-free version of the content, a retransmission request is sent via the return channel (e.g. a phone-line modem or cable return channel) and the head end rebroadcasts the content to the STBs which requested it.

In addition to the catalog pages themselves, tags are included to indicate when the content expires (e.g., at the end of the month contracted for), the priority level of the content, and when the display application should be launched (this may be left for the subscriber to decide). Priority level is used to determine if this content or other content takes precedence (in display or storage) in the case of competition with other content during the period of conditional availability. For example, if another advertiser pays more for storage during this period, some of the first advertiser's content may be deleted early, scaled down in resolution so as to occupy less storage, or displayed less often.

The subscribers are notified that the content is available for their perusal. This notification (and/or the display of the content) may be coordinated with the viewing of a commercial for the advertiser's product. At the end of the month, the STB application purges the storage of the content, making room for the content of another advertiser.

An application is enabled for managing disk space on STB storage devices which are expected to be common and are increasingly inexpensive. Addition or deletion of objects to/from these storage devices will be controlled by the remote nodes, which will own some of the storage on these devices, and will rent device space to advertisers for specific time periods. As noted above, objects thus managed can include local advertisement content which is to be included in and coordinated with broad advertisement content, such as phone numbers of local franchises which are displayed in tandem with an advertisement for the national chain.

The utilization of storage on the STB's disk drive (or other memory) can be pre-emptive and/or opportunistic. In the case of the distribution of catalog page images, a subset of the STB storage owned by the remote node will be read-only accessible to the user's image browsing application. These pages may thus be viewed off-line (even when the user is not watching television) or displayed on-screen at relevant moments in the program (such as during an advertisement for the advertiser's products.)

In a third implementation of the current invention, the invention is used to locally cache copies of software programs or program updates for distribution to the STB's or PC's of subscribers. This third preferred embodiment deals with an STB or PC as the end device. Software which is to be resident on the STB or PC can be downloaded to it by use of the broadcast distribution described in the invention. Frequently, software manufacturers will need to update the version of software which has been installed on client devices, in order to fix problems or expand capabilities. The update process involves some memory management issues, since later versions of software often require more storage capacity than earlier versions.

The software update and memory management thus enabled in this embodiment can take place without the user's intervention, if so desired, provided that the end device is connected to the network), and can occur at off-peak times. The update can be broadcast to all nodes which have the software installed and have subscribed to the update service, provided that the node managing the memory at the end device has reserved some of the memory it owns at the device for the larger size of the software update. Alternatively, if sufficient memory is not available, the managing node may pre-empt some lower-priority content for this purpose.

The same mechanisms can be used for the download of new software which has been requested by the user, which can be broadcast at off-peak times to the end device with the necessary memory management tasks being handled remotely. The "install" application can be part of the device's embedded code or can be included in the download. The software can be launched automatically at start-up (in the STB or PC case) or initiated by the user, when prompted by a system message, in the PC case.

Having thus described the invention, what is claimed is:

1. A method for the reliable distribution of content, from a source node to storage at a recipient node in a distributed storage network comprising a plurality of nodes comprising the source node, at least one recipient node, and a plurality of intermediate nodes disposed between said source node and said recipient node, said method comprising the steps of:

said source node generating control information regarding said content, said control information comprising access information;

said source node assembling at least one packet comprising said content and said control information and addressing information only for a first proximate node, which first proximate node is an intermediate node that is proximate to said source node and is a node other than the recipient node;

said source node transmitting the at least one packet to the first proximate node; and said first proximate node directing the at least one packet to the recipient node via at least one additional intermediate nodes, wherein each intermediate node stores device characteristics about each node to which it is proximate and wherein said directing is based on said stored device characteristics and said control information.

2. The method of claim 1 wherein said access information specifies which of said plurality of nodes can modify said content and further comprising at least one of the first proximate node and the at least one additional intermediate node modifying said content.

3. The method of claim 1 wherein said access information specifies which of said plurality of nodes can modify said addressing information and further comprising at least one of the first proximate node and the at least one additional intermediate node modifying said addressing information.

4. The method of claim 1 wherein said access information specifies which of said plurality of nodes can modify said access information and further comprising at least one of the first proximate node and the at least one additional intermediate node modifying said access information.

5. The method of claim 1 wherein said control information additionally comprises disposition information.

6. The method of claim 5 wherein said access information specifies which of said plurality of nodes can modify said disposition information and further comprising at least one of the first proximate node and the at least one additional intermediate node modifying said disposition information.

7. The method of claim 5 wherein said disposition information specifies local addressing information for the storage of said content at said recipient node.

8. The method of claim 5 wherein said disposition information specifies display information for said content at said recipient node.

9. The method of claim 5 wherein said disposition information specifies the schedule for handling said content at said recipient node.

10. The method of claim 5 wherein said disposition information comprises pre-emption information regarding the storage and display of said content in relation to other content at said recipient node.

11. The method of claim 1 further comprising said source node negotiating with at least one of said plurality of nodes to obtain storage for said content.

12. The method of claim 11 wherein said negotiating is performed by an application at said source node.

13. The method of claim 11 wherein said negotiating is performed for said source node by an application running on one of said plurality of nodes.

14. The method of claim 11 wherein said negotiating comprises locating storage space and obtaining access to said storage space.

15. The method of claim 14 wherein each of said plurality of nodes maintains storage information including storage expiration time of content stored therein and further comprising locating storage space using said storage information.

16. The method of claim 14 wherein said locating comprises contacting a plurality of nodes and wherein at least one application running on the each of the plurality of nodes determines if said storage is available.

17. The method of claim 16 wherein said negotiating is performed by at least one application on at least one of said plurality of nodes.

18. The method of claim 1 wherein said access information specifies user access at said recipient node to said content.

19. A distributed system for management, distribution, and storage of content comprising:
- a source node which initiates sending of content for storage;
- a plurality of end nodes each having a plurality of storage locations;
- a plurality of intermediate nodes disposed between said source node and said end nodes, each intermediate node storing device characteristics about every node proximate to the intermediate node;
- at least one owning node having control of at least one of the plurality of storage locations at one of the plurality of end nodes, said owning node comprising one of an end node and an intermediate node; and
- wherein said at least one source node is adapted for generating control information regarding said content and for distributing packets comprising said control information and said content for storage in at least one of said storage locations using addressing information for at least one intermediate node.

20. The system of claim 19 wherein said intermediate nodes are adapted to route said content toward at least one of said plurality of end nodes by changing the addressing information of said content based on said stored device characteristics.

21. The system of claim 19 wherein said intermediate nodes are adapted to utilize said control information for routing said content toward at least one of said plurality of end nodes.

22. The system of claim 21 wherein said intermediate nodes are adapted to modify said control information.

23. The system of claim 19 wherein said intermediate nodes are adapted to modify said content.

24. The system of claim 19 wherein said source node is adapted to negotiate with said at least one owning node for access to at least one of said plurality of storage locations.

25. The system of claim 19 wherein at least one intermediate node other than the owning node is adapted to negotiate with said at least one owning node for said source node to obtain access to at least one of said plurality of storage locations.

26. The system of claim 19 wherein said plurality of intermediate nodes comprise a plurality of proximate nodes each located proximate to an end node and being adapted to communicate with said at least one owning node and to manage storage at said end node.

27. A distributed storage management system for the reliable distribution and storage of content according to storage management information comprising:
- a plurality of end nodes each having a plurality of storage locations for storing said content;
- at least one owning node having control of at least one of the plurality of storage locations at one of the plurality of end nodes;
- at least one source node for distributing said content for storage in at least one of said storage locations using addressing information and wherein said at least one source node is additionally adapted for generating control information regarding said content; and
- a plurality of intermediate nodes located between said source and said end nodes, each of said intermediate nodes having local memory for storing a portion of said management information and being adapted to modify at least one of said control and said addressing information based on said portion of management information to effect routing of said content for storage,
- wherein said at least one source node is adapted for distributing packets comprising said control information and said content for storage in at least one of said storage locations using addressing information for at least one intermediate node.

28. A method for the reliable distribution of content, from a source node to storage at a recipient node in a network comprising a plurality of nodes comprising the source node, at least one recipient node, and a plurality of intermediate nodes disposed between said source node and said recipient node, wherein each of said plurality of nodes stores a portion of distributed storage management information, said method comprising the steps of:
- said source node generating control information regarding said content, said control information comprising access information;
- said source node assembling at least one packet comprising said content and said control information and addressing information only for a first proximate node, which first proximate node is an intermediate node that is proximate to said source node and is a node other than the recipient node;
- said source node transmitting the at least one packet to the first proximate node;
- said first proximate node directing the at least one packet to the recipient node via at least one intermediate node; and
- said at least one intermediate node modifying at least one of said addressing information and said control information based on said portion of said distributed storage management information.

* * * * *